(12) United States Patent
Wirth et al.

(10) Patent No.: US 11,640,673 B2
(45) Date of Patent: May 2, 2023

(54) METHOD AND SYSTEM FOR MEASURING AN OBJECT BY MEANS OF STEREOSCOPY

(71) Applicant: ISRA VISION AG, Darmstadt (DE)

(72) Inventors: Holger Wirth, Langen (DE); Peter Neugebauer, Griesheim (DE); Manuel Scholz, Darmstadt (DE); Enis Ersü, Darmstadt (DE)

(73) Assignee: ISRA VISION AG, Darmstadt (DE)

(*) Notice: Subject to any disclaimer, the term of this patent is extended or adjusted under 35 U.S.C. 154(b) by 0 days.

(21) Appl. No.: 17/045,702

(22) PCT Filed: Apr. 12, 2019

(86) PCT No.: PCT/EP2019/059521
§ 371 (c)(1),
(2) Date: Oct. 6, 2020

(87) PCT Pub. No.: WO2019/197656
PCT Pub. Date: Oct. 17, 2019

(65) Prior Publication Data
US 2021/0166412 A1 Jun. 3, 2021

(30) Foreign Application Priority Data
Apr. 13, 2018 (DE) .................. 10 2018 108 874.4

(51) Int. Cl.
G06T 7/593 (2017.01)
G06T 7/521 (2017.01)
(Continued)

(52) U.S. Cl.
CPC .............. G06T 7/596 (2017.01); G06T 7/13 (2017.01); G06T 7/521 (2017.01); G06T 7/85 (2017.01);
(Continued)

(58) Field of Classification Search
CPC .......... G06T 7/596; G06T 7/521; G06T 7/50; G06T 7/593; G06T 2207/10012;
(Continued)

(56) References Cited

U.S. PATENT DOCUMENTS 8,723,789 B1 5/2014 Rafil
9,521,399 B1 12/2016 Hazeghi
(Continued)

FOREIGN PATENT DOCUMENTS

DE 195 02 459 A1 8/1996
DE 10 2011 008 655 A1 7/2012
(Continued)

OTHER PUBLICATIONS

Zhang, Yueyi, et al. "Real-time scalable depth sensing with hybrid structured light illumination." IEEE Transactions on Image Processing 23.1 (2013): 97-109. (Year: 2013).*
(Continued)

Primary Examiner — Ian L Lemieux
(74) Attorney, Agent, or Firm — The Roy Gross Law Firm, LLC; Roy Gross

(57) ABSTRACT

The invention relates to a method and a system for measuring an object (2) by means of stereoscopy, in which method a pattern (3) is projected onto the object surface by means of a projector (9) and the pattern (3), which is designated as a scene and is projected onto the object surface, is captured by at least two cameras (4.1, 4.2, 4.3, 4.4), wherein correspondences of the scene are found in the images captured by the cameras (4.1, 4.2, 4.3, 4.4) by means of a computing unit (5) using image processing, and the object (2) is measured by means of the correspondences found. According to the invention, the cameras (4.1, 4.2, 4.3, 4.4) are intrinsically and extrinsically calibrated, and a two-dimensional and temporal coding is generated during the pattern projection,
(Continued)

by (a) projecting a (completely) two-dimensionally coded pattern (3) and capturing the scene using the cameras (4.1, 4.2, 4.3, 4.4), and (b) projecting a temporally encoded pattern having a two-dimensionally different coding several times in succession and using the cameras (4.1, 4.2, 4.3, 4.4) to capture several scenes in succession, the capturing of said scenes being triggered simultaneously in each case.

13 Claims, 5 Drawing Sheets

(51) Int. Cl.
*G06T 7/13* (2017.01)
*G06T 7/80* (2017.01)

(52) U.S. Cl.
CPC .............. *G06T 2207/10012* (2013.01); *G06T 2207/10021* (2013.01)

(58) Field of Classification Search
CPC . G06T 2207/10021; G06T 2207/10028; G06T 7/13; G06T 7/80; G06T 7/85; G01B 21/042; G01B 11/2545
USPC ........................................................ 382/154
See application file for complete search history.

(56) References Cited

U.S. PATENT DOCUMENTS

| | | |
|---|---|---|
| 10,404,967 B2 | 9/2019 | Willomitzer |
| 10,582,186 B1* | 3/2020 | Baldwin ............... H04N 13/243 |
| 10,602,126 B2* | 3/2020 | Rowell ................. H04N 9/8715 |
| 2004/0105580 A1* | 6/2004 | Hager ...................... G06T 7/596 |
| | | 382/154 |
| 2014/0009584 A1 | 1/2014 | Lilienblum et al. |
| 2014/0063204 A1* | 3/2014 | Siercks ................ H04N 13/254 |
| | | 348/50 |
| 2014/0198185 A1* | 7/2014 | Haugen ............... G01B 11/2545 |
| | | 348/48 |
| 2016/0070991 A1 | 3/2016 | Galera et al. |
| 2016/0180511 A1* | 6/2016 | Zhou ..................... B29C 66/723 |
| | | 348/187 |
| 2017/0034499 A1* | 2/2017 | Doron .................... H04N 13/25 |
| 2017/0094251 A1 | 3/2017 | Wolke et al. |
| 2017/0374331 A1 | 12/2017 | LIU et al. |

FOREIGN PATENT DOCUMENTS

| | | |
|---|---|---|
| DE | 10 2011 121 696 A1 | 6/2013 |
| DE | 10 2016 118 562 A1 | 3/2017 |
| DE | 10 2016 002 398 A1 | 8/2017 |

OTHER PUBLICATIONS

Huang, Yung-Lin, Tang-Wei Hsu, and Shao-Yi Chien. "Edge-aware depth completion for point-cloud 3D scene visualization on an RGB-D camera." 2014 IEEE Visual Communications and Image Processing Conference. IEEE, 2014. (Year: 2014).*
Garrido-Jurado, Sergio, et al. "Simultaneous reconstruction and calibration for multi-view structured light scanning." Journal of Visual Communication and Image Representation 39 (2016): 120-131. (Year: 2016).*
Bastian Harendt et al: "3D shape measurement of static and moving objects with adaptive spatiotemporal correlation", Optical Society of America, Sep. 29, 2014, pp. 7507-7516. XP001592694.
Schreiber W. et al. "Theory and arrangements of self-calibrating whole-body three-dimensional measurement system using fringe projection technique", Society of Photo-Optical Instrumentation Engineers, pp. 159-170 pp. XP001092868.
Marcus Grosse: "Fast data acquisition for three-dimensional shape measurement using fixed-pattern projection and temporal coding", Optical Engineering, 4 pp. XP 55396813A.
Salvi J. et al.: "Pattern modification strategies in structured light systems", 2003 Pattern Recognition Society, 24 pp. XP4491495A.
PCT Search Report (English Translation) for International Application No. PCT/EP2019/059521, dated Jun. 27, 2019, 3 pp.
PCT Written Opinion for International Application No. PCT/EP2019/059521, dated Jun. 27, 2019, 10 pp.

* cited by examiner

METHOD AND SYSTEM FOR MEASURING AN OBJECT BY MEANS OF STEREOSCOPY

CROSS REFERENCE TO RELATED APPLICATIONS

This application is a National Phase of PCT Patent Application No. PCT/EP2019/059521 having International filing date of Apr. 12, 2019, which claims the benefit of priority of DE 102018108874.4 filed on Apr. 13, 2018. The contents of the above applications are all incorporated by reference as if fully set forth herein in their entirety.

The invention relates to a method and a system for measuring in particular three-dimensional objects by means of stereoscopy, with a method according to the preamble of claim 1 and a device according to the preamble of claim 12, in which a pattern is projected onto the object surface by means of a projector and the pattern, which is designated as a scene and is projected onto the object surface, is captured by at least two cameras. Correspondences of the scene are found in the images captured by the cameras by means of an arithmetic unit using image processing, and the object is measured by means of the correspondences found. This is achieved in particular by determining the coordinates of the identified correspondences. In other words, the object surface which is illuminated with the projected pattern is measured.

What is known as stereoscopy is a known method for three-dimensional optical measurement of objects. For this purpose, two cameras are used which are mounted so as to be at a particular spacing from one another, and which face the scene to be measured. There are passive methods which attempt to manage with natural illumination or at least unstructured illumination, and active methods which use structured illumination. The structured illumination is used in order that the most difficult problem in stereo methods, specifically robust detection of correspondences in the images of the different cameras, can be reliably overcome. In turn, a plurality of methods is known here, all ultimately evaluating pixels in each camera.

An example for a method of this kind is known from DE 10 2016 002 398 A1, in which a plurality of (uncoded narrow) light lines are projected onto the object to be measured, and the projected lines are captured by means of a camera. Since these are uncoded lines, as the number of lines increases indexing of the lines is difficult in the case of a large viewing angle between the camera and the projection angle of the lines. However, a large viewing angle (triangulation angle) allows for precise determination of the depth of the object at the measuring point, the line index needing to be known for measuring the object. It is systemically impossible to achieve a precise measurement of the depth of the object with a simultaneously high resolution, i.e. a high density of the projected lines. It is therefore proposed to perform a measurement using two cameras having different sizes of triangulation angles with respect to the optical axis of the line projection, which cameras capture the same pixels simultaneously—a first camera having a small triangulation angle and a second camera having a large triangulation angle. The camera having the small triangulation angle allows for very precise indexing of the projected lines in the event of significant uncertainty of measurement of the spacing or depth of the object. The camera having the large triangulation angle allows for precise depth determination with a small triangulation angle, but no precise indexing of the lines projected in a dense line pattern, such that these data cannot be clearly evaluated. For the purpose of coupling the data, back projection of the individual data of the triangulation sensors is proposed, in which initially a first model of the object is reconstructed from the data of the camera having a small triangulation sensor, which two a significant measuring uncertainty with respect to the actual depth, but allows for accurate location of the projected line. The 3D points of the first model are now digitally projected back, with the indexing obtained from the triangulation measurement of the first camera, into the camera image of the second camera having a large triangulation sensor. The points thus obtained do not have significant noise, but correct indexing. Thus, precise association of the indices of the lines with the more exact depth measurement should be possible by means of the triangulation measurement of the second camera. However, the back projection is complex and fault-prone, since the accuracy in the association of the indices with the measuring points in the back projection is not entirely clear, depending on the specific shape of the object to be measured.

A method for measuring depth-limited objects is known from DE 10 2011 121 969 A1, in which a temporally changeable pattern is projected onto an object and captured by means of two calibrated cameras of a stereo system, homologous points being associated with one another according to the time correlation method. This is achieved by a pixel-based similarity analysis of the temporal gray value curves of the individual pixels. In this case, the 3D measurement is restricted to depth-limited objects, i.e. objects of which the shape deviation is limited to a reference object, and for which the search for the correspondence association takes place in an adjusted search field. This restriction is necessary in order to be able to reliably correlate, with one another, the temporal gray value curves, also of a few image sequences.

The problem addressed by the invention is that of developing a method and system of this kind such that the measurement of the objects is more resilient and less fault-prone. The method and system proposed according to the invention are intended in particular for use in industrial environments, in particular when manufacturing or assembling three-dimensional objects.

In the method proposed according to the invention, the cameras are in particular intrinsically and extrinsically calibrated. A two-dimensional coding and a temporal coding are generated during the pattern projection, by projecting a (completely) two-dimensionally coded pattern, and capturing the scene using the cameras preferably being triggered simultaneously, and projecting a temporally coded pattern having a two-dimensionally different coding, several times in succession, and using the cameras to capture a plurality of scenes in succession, being triggered simultaneously in each case.

In the case of the two-dimensional coding, correspondences of adjacent pixels are found, for the scene, in the images captured by the different cameras. Furthermore, in the case of the temporal coding, for the plurality of scenes correspondences of the same pixels, in each case, are found in the images captured by the different cameras. For each pixel, identified correspondences in the two-dimensional coding and in the temporal coding are correlated, and said correlations are used when measuring the object. This can be used for example in averaging different coordinate point calculations, checking for deviations, and assessing, by means of permissible tolerances, discarding of individual pixels or the like.

A completely two-dimensionally coded pattern is to be understood such that the pattern is coded at least in the entire projection region of interest, which region is the portion of the pattern that is shown on the object (or more precisely the surface of the object) by means of the projection. In principle, in the case of a two-dimensional coding, a pattern is projected that implements a two-dimensional coding, i.e. a pattern point can be clearly identified in the context of the overall pattern or at least a particular pattern environment around said pattern point. In this case, two-dimensional pseudo-random patterns have been found to be particularly advantageous, the resolution of which patterns is selected such that the cameras can only just reliably resolve the individual pattern points, i.e. that the resolution of the pixels of the camera is greater than the individual pattern points. In other words, the pixels of the camera, on which the pattern is imaged, are smaller than the pattern points of the pattern imaged in the pixels of the camera. A pattern point is thus described by a plurality of pixels of the camera and of the camera image which are preferably adjacent in two dimensions. The required degree of resolution of the pattern points in order for the image processing of the individual pattern points to be detected (i.e. resolved) reliably depends on the optical conditions in each case, and is optionally determined by a person skilled in the art, when constructing the system, through theoretical considerations and/or tests, and can be set accordingly. It is in principle possible, depending on the application, for a pattern point to be imaged approximately in just one camera pixel. However, it will frequently also be expedient for a pattern point to have a two-dimensional arrangement of a plurality of camera pixels.

The advantage of said spatially or two-dimensionally coded patterns is that they can make do with a single image in each camera. It is disadvantageous, however, that they require proximity information for each pattern point. Thus, enough surface must still be imaged in the pixels of the camera, in the surroundings of each pattern point, such that at least as much of the pattern surroundings is still identifiable such that the two-dimensional coding generated, according to the invention, by the arrangement of the individual pattern points relative to one another, can be reliably identified. Furthermore, for the same reason, said method is relatively prone to interference, for example due to interference or reflections in the images of the camera.

In the case of the temporal coding, a plurality of patterns are projected and captured in quick succession. These patterns differ slightly from one another. In this case, the coding is in the temporal sequence of brightness values or gray values which follow one another in each pattern point (or camera pixel or the camera pixels imaging the pattern points). This method is advantageous in that no proximity information is required for the individual pattern points. As a result the identification is more robust and the lateral resolution of the camera can be used in full. The disadvantage of the method is that a plurality of images are required in order to achieve sufficient coding for each pattern point.

According to the invention, a particularly reliable and robust coding and measurement is achieved by means of a combination of a two-dimensional and a temporal coding, which then also provides information about the object that is to be measured in three dimensions, if one of the two codings cannot provide any, or any accurate, information. There may be many reasons for this, such as random reflections or underlying object structures which cover pattern structures in the two-dimensional or temporal coding. However, correlation of the two-dimensional and temporal coding makes the measurement significantly more reliable because interference can, in many cases, be corrected by the other coding in each case. In the case of the presence of coordinates of the measuring points of the object to be measured (also referred to as a point cloud of coordinate points which, overall, form or characterize or indicate the surface of the object to be measured) both from a two-dimensional and temporal coding, the achievable accuracy is furthermore increased owing to the redundancies, especially since the different codings react to different interference with differing degrees of sensitivity.

According to a preferred embodiment, the temporally coded pattern can be generated by at least one spatial shift or a plurality of (optionally also different) spatial shifts of the same (completely) two-dimensionally coded pattern. As a result, different pattern information can be displayed, in a temporally offset manner, in a pattern point or camera pixel. As a result, temporal coding can be achieved in a simple manner, by means of a particular sequence of the temporal information. The magnitude of the spatial shift is preferably small or low in comparison with the overall size of the projected pattern. For example, the shift is in the order of magnitude of a pattern point, it being possible for order of magnitude to mean approximately a range of from 0.25 times to 10 times the size of a pattern point. The image resolution of the camera is preferably greater (higher) than a pattern point, preferably at least 5 or 10 times as great. However, according to the invention the size of a pattern point in the imaging of the pattern point in the camera can also correspond to the size of a pixel of the camera. An expedient ratio of the camera resolution and the size of the projected pattern point also depends on the size and type of the object, and can be set by a person skilled in the art if required.

In the case of the two-dimensional coding, a pixel essentially means a pattern point, which will be defined in greater detail in the following. Since, according to the invention, the pixel resolution of the camera is in many cases greater than the rasterization of the pattern comprising individual pattern points, usually a plurality of camera pixels (in the sense of the technically smallest possible pixels) are combined, according to the invention, for the evaluation, in order to describe pattern points as pixels which are then evaluated by means of image processing in order to find two-dimensional correspondences. In principle, however, according to the invention individual camera pixel can also be considered pixels.

According to the invention this (i.e. evaluating individual camera pixels as pixels) is preferably the case in temporal coding in which it is technically simpler to examine every pixel of a camera image for the temporal sequence of the content values, i.e. to determine the temporal coding, and find correspondences in the images of the other cameras.

According to a preferred embodiment of the invention, the evaluated pixels can thus be defined differently in the two-dimensional and the temporal coding. The correlation of the correspondences of the two-dimensional coding and the temporal coding, proposed according to the invention, in this case takes place, according to the invention, on the basis of the smaller pixels, i.e. specifically the camera pixels.

However, the definition of different pixels in the different codings is optional, since the method can in principle also be carried out if the pixels are defined identically (in one way or another) when evaluating the two codings.

According to the invention it may be possible for the spatial shift of the pattern and the capturing of the scene by the cameras, triggered simultaneously, to not be matched to one another. This means that these are not in a specified relationship with one another, but are instead temporally random with respect to one another. This prevents systematic errors from occurring.

Furthermore, the size of the spatial shift between the successively captured scenes for generating a temporal coding may be different. This also serves to prevent systematic errors by random matching of the size of the shift of the pattern, and possible structures identifiable on the object.

According to an embodiment that is preferred according to the invention, the size of at least one of the spatial shifts may be smaller than a pattern point of the two-dimensional pattern, for example approximately half a pattern point. A pattern point, corresponding to a pixel in the image acquisition, is understood to be the smallest pattern region shown in the pattern, from which the entire pattern can be displayed by means of two-dimensional joining of various smallest pattern regions (having different and/or the same content in the image, a pattern region in each case being assigned a content value such as color or brightness). In other words, a pattern point is formed by a grid point which results, upon rasterization of the entire pattern, from neighboring (adjacent) grid points in each case, one grid point (or pattern point) being associated with a two-dimensionally identical content (content value such as color or brightness).

This feature prevents systematic structures on the object and/or the object surface, the size of which corresponds to the pattern points or the systematic grid structure of the pattern on the object specified by the pattern points, from leading to systematic errors in assessing the correlations.

It is also possible, according to the invention, to generate the temporally coded pattern by phase-shifted projection of a brightness distribution. A (temporally) phase-shifted projection can be achieved as the only implementation of a temporally coded pattern, or in combination of the above-described spatial shift of a two-dimensional pattern in one or more of the embodiments described above.

The phase-shifted projection of a brightness distribution can be achieved for example by projection of a two-dimensional pattern having different projection brightnesses. Any desired two-dimensional pattern can be used as the pattern. This is advantageous in that a simple slide projector can be used for the pattern projection, which projector projects a pattern provided (physically) on a transparent carrier (slide), different brightnesses being generated by corresponding actuation of the projection lamps and/or by filters of different densities, for example gray filters, which are superimposed on the transparent carrier of the pattern (pattern carrier) in the projection.

A slide projector of this kind can also be used for the above-described spatial shift of a two-dimensional pattern. It is sufficient, here, to (minimally) spatially shift and/or tilt (also referred to in the following, in a general manner, as "move") the slide carrier, provided with the slide bearing the pattern, of the otherwise stationary side projector (including the spatially arranged projection optics thereof). The movement is then shown on the surface of the object, according to the projection optics. As a result, the shift of the slide is imaged on the object in accordance with the projection enlargement. This is what is meant by the term "minimal shift and/or tilt." Thus, a movement of the slide in front of the projection optics that is reduced by the factor of the projection enlargement is sufficient for achieving the desired spatial shift of the pattern on the object.

The advantage of such slide projectors which can be used, according to the invention, for performing the method described herein, is that said projectors are cost-effective, robust, and technically easy to handle. The are therefore suitable in particular for industrial environments.

It is in principle also possible to use digital projectors which can project any pattern that can be shown on a display. In addition to two-dimensional (structure) patterns, these can also for example project an (inherently structureless) brightness distribution onto the object, the spatial position of which changes in a temporal phase-shifted manner. A typical example is a temporally phase-shifted sine brightness profile which can be generated and handled in a particularly simple manner. In a phase-shift method of this kind, for example sinusoidal gray value curves are projected in a phase-shifted manner. It is theoretically possible to manage with three phase-shifted patterns for a sine curve of this kind, but in practice at least four phase-shifted patterns are almost always used. In order to be able to resolve the ambiguities of the sine curve, in industrial settings usually significantly more patterns are required. This can be implemented in a comparatively simple manner by means of digital projectors. Of course, the invention is in principle not restricted to the sinusoidal gray value curves (or general brightness curves) described herein by way of example.

When using (conventional) slide projectors it is simpler, according to the invention, to use method variants in which only a two-dimensional pattern is projected. However, using suitable slide trays (having the corresponding positioning accuracy) it is in principle also possible to project different (two-dimensionally structured) pattern in temporal succession, even if this can be achieved in a simpler manner by means of digital projectors. However, these are technically more complex and significantly more expensive, but also allow for the use of a wide range of patterns, simply by digital pattern definition.

In principle, another possible variant of the method described is that of generating the temporally coded pattern by temporally offset projection of different patterns. This variant of the method can in principle also be freely combined with all the above-described variants.

According to a preferred embodiment of the method proposed according to the invention, it may be possible to perform a correlation of information of all the cameras for one pixel of the pattern, also referred to, in the sense described above, as a pattern point.

It is particularly advantageous to use a correlation of information of all the cameras and all the codings used, at least as the at least one two-dimensional and the at least one temporal coding, together (and simultaneously), and to design an evaluation algorithm, implemented in an arithmetic unit for the purpose of carrying out the described method, such that all the information from all the cameras and/or all the codings is integrated and evaluated together. This results in two significant advantages:

Firstly, a pixel cannot be measured only if all the information sources fail. In other words, a pixel can be evaluated as soon as it is recorded in one of the plurality of codings used, and in two cameras. The, preferably plurality of, codings, and the preferably more than two cameras, thus result, according to the invention, in the method for measuring objects being more robust, particularly in industrial surroundings that are technically difficult from an imaging perspective.

Secondly, the maximum possible information is processed for each pixel. This leads to redundancies in the information available for a pixel, because otherwise more than the essentially required information sources are available. This redundant information can be checked simultaneously. According to suitable criteria that can be set, on a case-bycase basis, by a person skilled in the art, the redundant information available overall can then be combined to form reliable pixel information, for example by means of algorithmic connection and/or rejection of specific information (assessed as incorrect). In this case, methods of artificial intelligence, fuzzy logic and/or similar aids can be used.

Since stereoscopy requires at least two images of a pixel, according to an embodiment that is preferred according to the invention, it is proposed for the scene to be captured by means of at least three cameras, preferably four cameras, from different viewing angles. As a result, redundant image acquisition is created, which, as described above, further increases the robustness of the method.

In order to further improve the above-described (three-dimensional) measurement of the object it is proposed, in a further embodiment, to evaluate the images of individual cameras, i.e. one or also more cameras, by means of two-dimensional image analysis, in particular for edge identification, and to project an edge, identified in an image, into a three-dimensional point cloud. The three-dimensional point cloud (entirety of the measured coordinate points of the surface of the object), is in particular the result of the three-dimensional measurement of the object, as has been described above. The described sensor system having the stereoscopic measurement of three-dimensional objects is accordingly also referred to as point cloud sensors, because the result of the measurement forms a point cloud consisting of three-dimensional coordinate points (obtained by the measurement), which describe the surface of the object to be measured.

Measurements of this kind allow for two-dimensional objects, i.e. objects having a continuous surface (i.e. two-dimensional features), to be measured very well. However, problems often arise at discontinuous transitions, such as edges, cutting edges, holes, step-like elevations and the like. In particular in the case of sensors having active illumination, whether with or without pattern projection, optical effects such as blooming or dimming, which disrupt the measurement, often occur at edges of this kind. This results from the discontinuities (referred to, in summary, in this text as "edges") never being ideal in reality. For example, if cut material is of a particular thickness (e.g. sheet metal), small indentations or bulges form at the edges, which indentations or bulges function as optical microlenses or micro collecting mirrors.

At sharp edges, there is an added problem that a camera pixel cannot be infinitely small. Ultimately, a (even if small) region of the surface of the object is always imaged on the camera pixel. Thus, in the case of an edge extending through a pixel (i.e. discontinuity of the surface) there are different surfaces (imaged on the camera pixel) in the imaging region. As a result, a brightness results for said pixel that is somewhere between the brightness of one surface and the brightness of the other surface, it being possible for one of the surfaces to also be a background which does not belong to the object to be measured.

Conventional camera-based 3D measurement methods interpret such brightness differences as height changes of the object, although there is no height change at all, bur rather merely an edge of the object extends through said surface (pixel). For methods in which a two-dimensional coding is used, the same also applies for said two-dimensional code. If this is located on the edge, depending on the method this likewise leads to apparent height changes in the three-dimensional coordinates of the point cloud describing the measurement of the object.

Since the shape of the edge is, a priori, usually not known, this effect cannot be compensated or corrected to a high degree of accuracy. The occurring effects at edges of this kind can even result in individual camera pixels no longer be evaluable at all. The coding of the camera pixel is then no longer interpretable. In particular if the edge (viewed proceeding from the camera or the sensor) is the rear edge of a surface, it is no longer possible to precisely determine, in the point cloud, where the surface stops. It is not possible to reliably identify whether there is no longer a point present in the surface, because the surface has ended or because there is interference of this kind. This is a particular problem of three-dimensional evaluation by means of stereometrics.

A higher degree of accuracy in the case of discontinuities (or edges) can be achieved, according to the invention, in that the camera images are used not only for the algorithm for the 3D point cloud calculation, but instead are additionally also still evaluated in a two-dimensional manner, i.e. the image of the or each camera of the plurality of cameras is supplied to independent image evaluation in each case. Evaluation of this kind of an individual camera image makes it possible, in particular owing to gradients in brightness and/or color arising in each image, for edges (in the sense of discontinuities) to be determined in the images. The edges thus determined are then projected into the point cloud using the known calibration parameters of the camera. It is thus possible to achieve an increased degree of accuracy at the edges, because the two-dimensionally identified edges are not subject to interference by the above-described effects in the three-dimensional reconstruction. Thus, according to the invention, assuming a constant edge progression it is possible to achieve reconstruction of the edge to even a sub-pixel degree of accuracy. Assuming that, in the case of an identified edge in the two-dimensional image, an abrupt discontinuity in the surface occurs, it is possible for the above-described effects that occur during the three-dimensional measurements to be smoothed and/or corrected by correlation of the data.

Provided that an edge is identifiable in a plurality of images, it is possible to determine a projection of the edge in the point cloud for each image, and the coordinates of the edge data in the point cloud from originating from different images can be correlated. The correlation can, for example, be achieved by simple averaging, weighted averaging, and/or smoothing of averaged coordinate data.

It may be advantageous in particular, for the two-dimensional image analysis, for additional images of the scene to be captured without projection of a pattern. In order to further increase the accuracy, the additional images can be captured using additional (unstructured) illumination. A pattern may interfere with the two-dimensional evaluation, since the structure of the pattern can interfere with the two-dimensional image evaluation as an artifact. Even if no additional images are captured, the accuracy can be increased simply by the two-dimensional evaluation of the data captured using structured illumination.

According to a further aspect of the invention, a particularly advantageous embodiment allows for extrinsic and/or intrinsic recalibration of the system during operation by means of capturing the scene using four cameras. If a pixel is visible in the images of all four cameras, a highly redundant system is present, because it is then very probable that, for each pixel, the information of two cameras, required for the stereoscopic measurement of the object, is available doubled. For the purpose of recalibration, it is possible to form two sub-systems from two different cameras in each case, calibration of one sub-system always using the measured values of the other sub-system. In principle this also applies in the case of just three cameras, in that it is possible to form three sub-systems each having two cameras, sub-systems comprising two cameras in each case each comprising exactly one identical camera. In the case of more than four cameras, the system can be scaled as desired.

Alternatively, the system as a whole can also be recalibrated. For this purpose, it is possible to use a modification of the bundle balancing that is known in principle to a person skilled in the art. In this case this is also possible in industrial environments, because sufficient information can be extracted from the four cameras. In principle, said recalibration can even be performed at every measurement. However, this is not always expedient because in general a very large number of measurements are performed in a very short time, in which there is generally no loss of adjustment requiring recalibration. In this respect it is preferable, according to the invention, to perform recalibration automatically, in specified temporal intervals, and/or manually, for example following particular instances of interference.

Using at least three, preferably four, or possibly even more, cameras thus makes it possible to solve the problem arising, in practice, in stereoscopic measurement, whereby the system reacts very sensitively to calibration errors. In order for it to be possible for a stereoscopic measurement to be performed, the participating cameras must be calibrated (as accurately as possible) both intrinsically and extrinsically.

The intrinsic calibration involves determining all the parameters that the cameras themselves describe, irrespective of the position thereof, i.e. for example focal length, optical distortion, main pixel shift, etc. Many different methods are known in the literature for how calibration of this kind can be performed. Almost all these methods use a pattern of control points, the position of which relative to one another is known. The control points can for example be points on a plate or also points attached in a spatially distributed manner. An image of said points is captured using the camera. The intrinsic parameters can be determined from the point positions identified in the image, and the known mutual relative positions of said points in space. Depending on the number and arrangement of the points, and the camera model used, the camera can thus be modelled to a greater or lesser degree of accuracy.

In the case of the extrinsic calibration, the position of the camera is determined based on an externally specified reference coordinate system. For this purpose, too, there are again a plurality of methods described in the literature, which methods usually also use control points. If the camera is already intrinsically calibrated, far fewer points (at least three) are sufficient here, although the position thereof in the reference coordinate system must be known.

If, during operation of a stereoscopic sensor, any parameter changes (e.g. due to heating, slight impacts, etc.), in a conventional system under industrial conditions this usually cannot be identified and/or corrected, as long as the parameter changes to not result in failure of the entire system. Although methods of bundle compensation exist, which can theoretically solve said problem, said methods require either a large number of points, or at least one known measure in the image. Often, both do not exist here.

Therefore, the recalibration proposed according to the invention, within the context of the method performed, is a particularly advantageous variant, which can also be used independently of the combined use of a two-dimensional and a temporal coding.

The invention furthermore proposes a system (in the sense of a device) for measuring in particular three-dimensional objects by means of stereoscopy, comprising a projector for projection of a two-dimensionally and/or temporally coded pattern onto the object surface, and comprising cameras for capturing the pattern that is designated a scene and is projected onto the object surface, as well as comprising an arithmetic unit which is designed, by means of a program for image processing, to find correspondences of the scene in the images captured by the cameras, and to perform a measurement of the object by means of the correspondences found. This can be achieved by determining the points of the correspondences found, i.e. in other words the object surface which is illuminated with the projected pattern is measured. For this purpose, the cameras are intrinsically and extrinsically calibrated, at least three cameras being provided, and being arranged such that the scene is captured from at least three different viewing angles.

As a result, as already described, redundancies are achieved in the stereoscopy, which make the measurement of the object more robust as a whole. Specifically, the at least three cameras solve the further problem, in stereoscopy under industrial conditions, that, for each measuring point, information from two images is always required, but said information often cannot be obtained using the two cameras provided. If it is intended to capture 3D point clouds of the very shiny parts that occur very often in industry, there are virtually always regions, in the image captured by a camera, in which specularity forms. Since this occurs at different points in each camera (the cameras have different viewing angles), all regions in which there is interference in at least one of the two cameras cannot be measured. A similar problem arises in the case of shadows. In conventional systems, all regions in which one of the two camera images is affected by interference are always absent. These absences are significantly reduced in the system proposed according to the invention comprising at least three cameras.

According to a particularly preferred embodiment of the proposed system, at least four cameras are provided and are arranged such that the scene is captured from at least four different viewing angles, all cameras being extrinsically and intrinsically calibrated, as described above, both for the proposed system and also for the proposed method.

In a proposed system that is particularly preferred according to the invention, the arithmetic unit can furthermore be designed to form sub-systems of two cameras in each case, from the plurality of cameras, and to perform recalibration of cameras from the system in that, in order to calibrate one sub-system, the measured values of the other sub-system are always used. Preferred possible variants of said method according to the invention for recalibration have already been described.

In addition, the arithmetic unit and/or the projector can be designed to generate a pattern projection having a two-dimensional and a temporal coding.

It has already been described that said method of pattern projection having a two-dimensional and a temporal coding can in principle also be performed using just two cameras, even if the use of at least three cameras is particularly preferred. Accordingly, the present invention also relates to a system for measuring objects by means of stereoscopy, comprising a projector for projection of a two-dimensionally and/or temporally coded pattern onto the object surface, and comprising cameras for capturing the pattern that is designated a scene and is projected onto the object surface, and comprising an arithmetic unit which is designed, by means of a program for image processing, to find correspondences of the scene in the images captured by the cameras, and to perform a measurement of the object by means of the correspondences found, the cameras being intrinsically and extrinsically calibrated, at least three cameras being provided and being arranged such that the scene is captured from at least two different viewing angles, and the arithmetic unit and/or the projector being designed to generate a pattern projection having a two-dimensional and a temporal coding.

According to a particularly preferred embodiment of the proposed system, the arithmetic unit is designed to perform the above-described method or parts thereof. In this respect, reference is made to the above explanation of the method. A person skilled in the art would accordingly incorporate the described device features into parts of the system proposed according to the invention, if necessary together, or according to the described function, as far as necessary.

In a particularly preferred system and/or method of this kind, according to the invention, the disadvantages of the systems known hitherto are overcome. This is achieved by the combination of two measures which each also already represent, per se, combinations of measures, specifically generating, together, two-dimensional and temporal codings, and the use of at least three cameras. Said measures lead to a large amount of redundant data which are correlated with one another, in order to improve the reliability and robustness of the information obtained from the stereoscopy.

Further advantages, features and possible applications of the invention will be explained in the following, with reference to a preferred embodiment and the drawings. In this case, the present invention relates to all the features described and/or illustrated, also independently of the summary thereof in the claims and the dependency references thereof.

Figure 4:
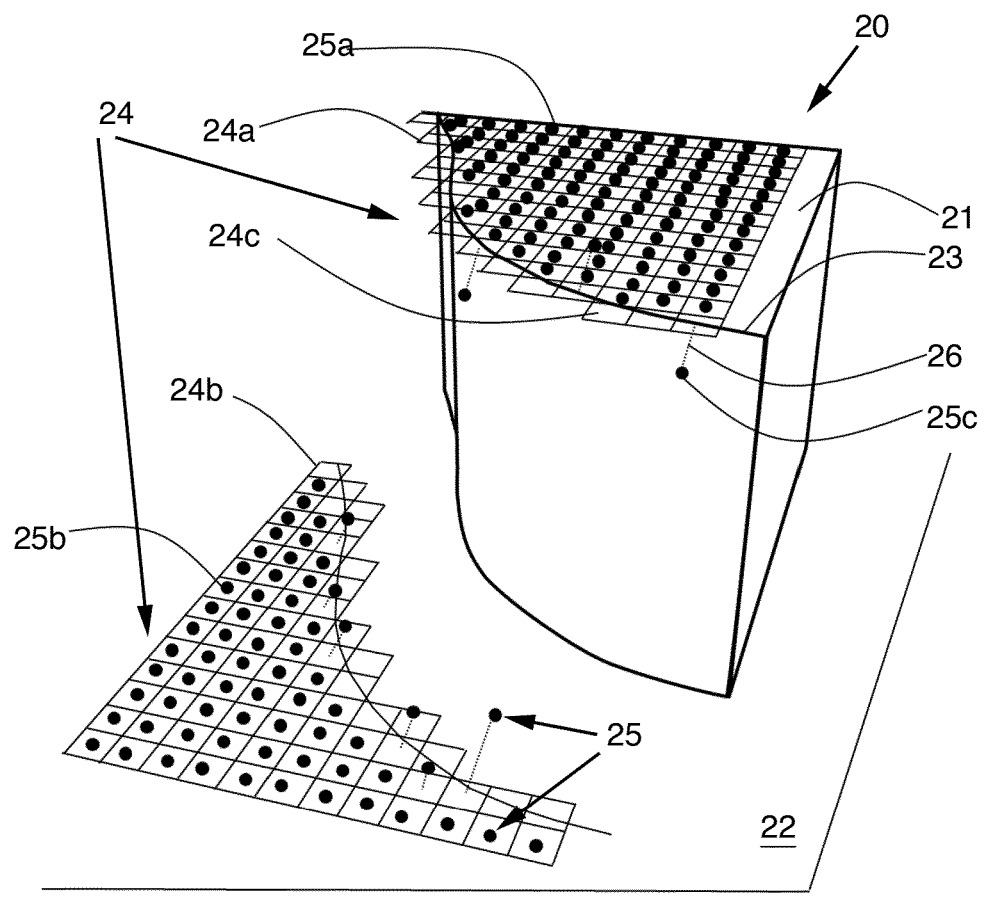
Figure 5:
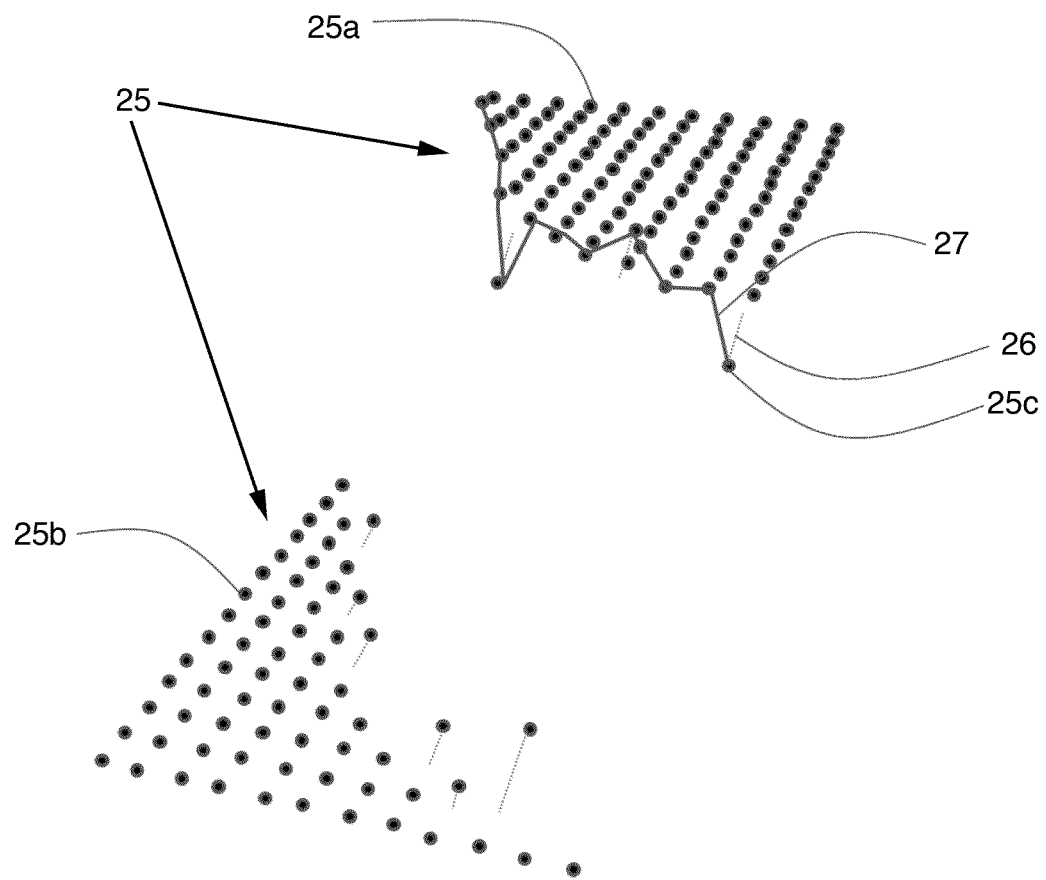
Figure 6:
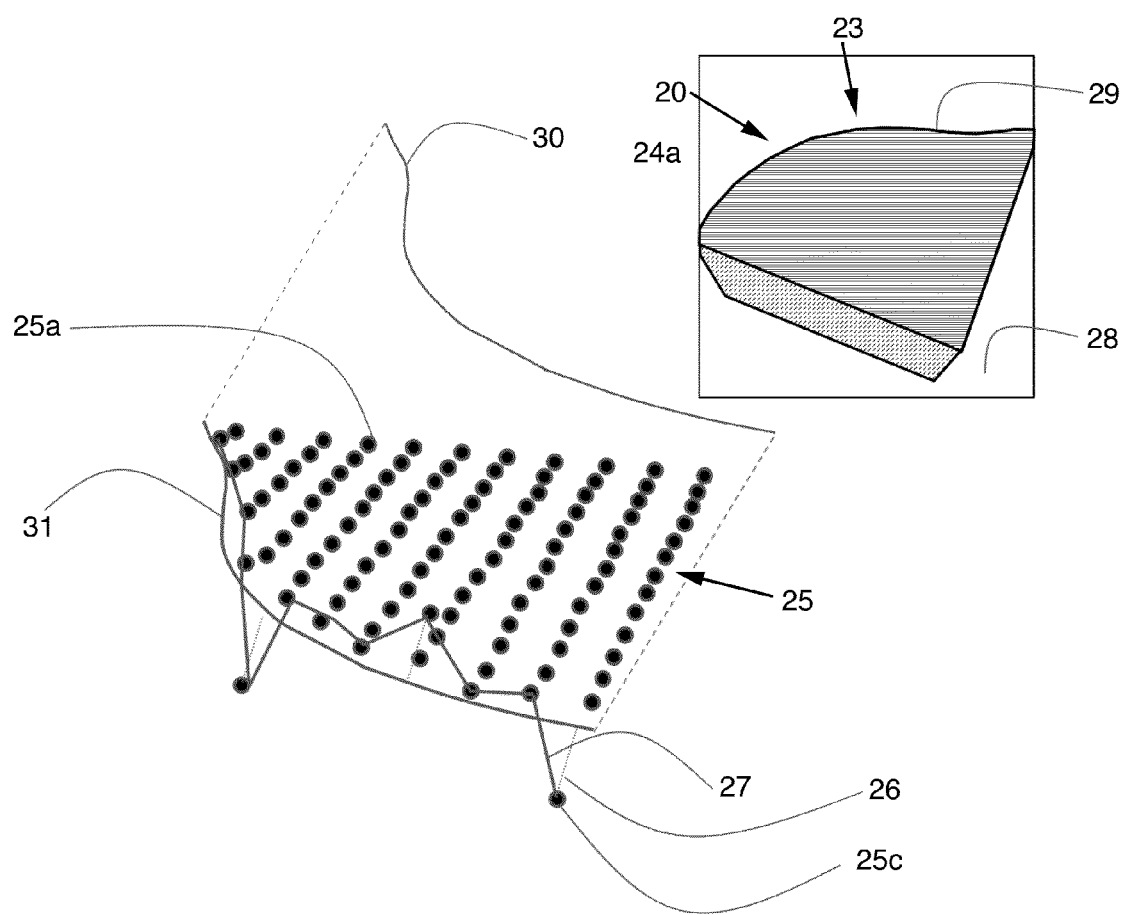

FIG. 4 schematically shows the measurement of an object in a grid by means of stereoscopy to a point cloud consisting of a plurality of three-dimensional points;

FIG. 5 schematically shows the reconstruction of an object edge between an upper and a lower surface in the point cloud according to FIG. 4; and FIG. 6 schematically shows the edge, determined from two-dimensional image analysis for edge identification, in projection in the point cloud according to FIG. 5.

Figure 1:
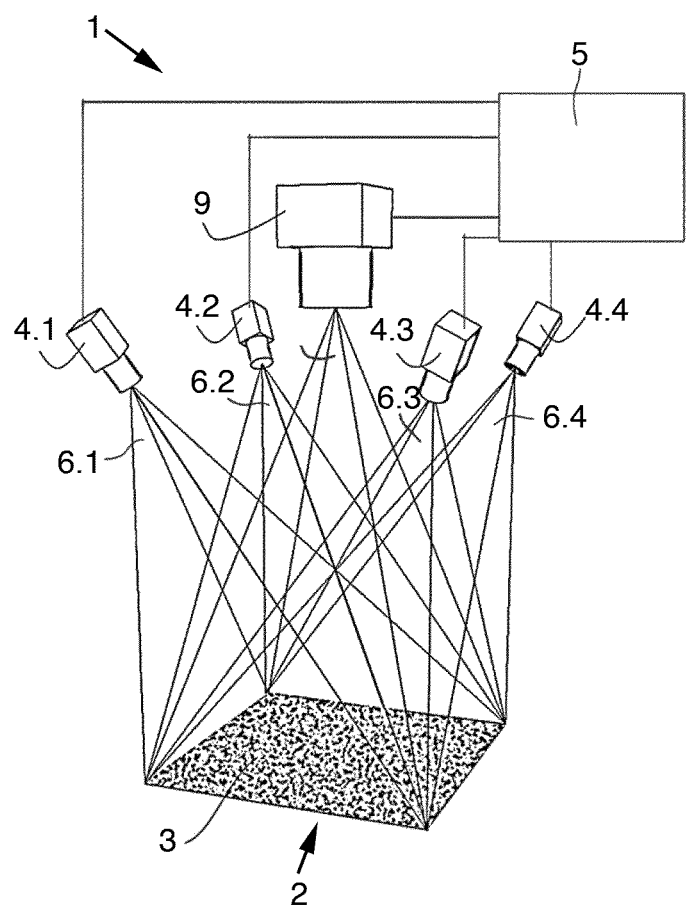
FIG. 1 is a schematic view of an embodiment of the system proposed according to the invention.

FIG. 1 shows a system 1 for measuring a three-dimensional object 2 by means of stereoscopy by way of example, in an embodiment that is shown schematically. In the schematic view of FIG. 1, for the sake of clarity the three-dimensional object is shown as a planar surface. However, the invention explicitly also relates to any three-dimensional objects 2, also including planar surfaces.

The system 1 comprises a projector 9 for projection of a (two-dimensionally and/or temporally) coded pattern 3 on the surface of the object 2. According to a particularly preferred embodiment, four cameras 4.1, 4.2, 4.3 and 4.4 for capturing the pattern 3 (referred to as a scene) projected on the object surface are provided in the system 1. The projector 9 can be a conventional slide projector or a digital projector in which the pattern 3 to be projected can be created on a transparent display according to a digital template.

Furthermore, an arithmetic unit 5 is provided which is connected to the projector 9 and the cameras 4.1, 4.2, 4.3 and 4.4 and is designed, by means of a program for image processing, to find correspondences of the scenes in the images captured by the cameras 4.1, 4.2, 4.3, 4.4, and to perform a measurement of the object 2 by means of the correspondences found, specifically by determining the points (coordinates) of the correspondences found. In other words, a measurement of the object 2 is carried out by means of the correspondences of pixels of the projected pattern 3 on the surface of the object 2. In this case, the coordinates of the pixels of the projected pattern on the surface are determined for the correspondences that have been found in the images of the different cameras 4.1, 4.2, 4.3, 4.4.

For this purpose, the cameras are intrinsically and extrinsically calibrated. The scene (i.e. the pattern 3 projected onto the surface of the object 2) is captured by the cameras 4.1, 4.2, 4.3, 4.4 from different viewing angles 6.1, 6.2, 6.3, 6.4 which are symbolized, in FIG. 1, for each camera 4.1, 4.2, 4.3, 4.4 by means of sight rays proceeding from the cameras 4.1, 4.2, 4.3, 4.4 to the corners of the captured region of the surface of the object (which corresponds to the images captured). The cameras 4.1, 4.2, 4.3, 4.4 are preferably digital cameras, the images of which can be directly processed by the arithmetic unit. The projection 7 is shown by corresponding sight rays proceeding from the projector 9.

In the following, the measurement of the object 2 by means of stereoscopy is described with reference to a preferred embodiment. In this case, within the context of the invention it is not essential for all the steps and features described in the following to be implemented. Variations of the individual steps are also conceivable, some of which have already been explained or indicated at the outset.

The projector 9 makes use of a completely coded, two-dimensional pattern 3 that generated a two-dimensional coding, and is thus suitable for identification of correspondences in a single image. The pattern 3 that is to be projected or that is projected on a flat plane is shown in yet more detail in FIG. 2, with individual pattern points 8, with reference to an example.

A randomly coded pattern 3 (pseudo-random pattern) has been found to be particularly advantageous, because it is possible to generate large-surface patterns therewith which are clearly coded even in small regions having few pattern points, and because they are easy to evaluate.

Said pattern 3 is in addition shifted in succession, multiple times, such that, in addition to the two-dimensional coding a temporal coding also results, in which, in the image of the camera 4.1, 4.2, 4.3, 4.4, the individual pixels of the projected pattern 3 show different items of information over time. Temporal coding is achieved by the temporally different information.

The preferable provision of a two-dimensional and a temporal coding combines the advantages of the two-dimensional and the temporal coding, without also taking on the disadvantages, since it is sufficient for each point, or the measurement of each point (pixel), that one of the codings can be evaluated successfully. Furthermore, owing to the redundancies the method is very robust for the points for which all the information from both codings is provided, and a very good degree of accuracy is achieved.

A random slight shift of the same pattern has been found to be advantageous. This is advantageous because it is very simple and cost-effective to achieve. There is no need for a complex projector 9 that is capable of projecting different images. Instead, a simple projector 9 is sufficient, in which a single slide is randomly moved. In this case, "random" relates to the fact that the movement is not in any way related to the time points of the image acquisitions.

A regular movement could also be used that is not synchronized to the image acquisition.

It has been found to be particularly advantageous for the shifts to also include such that are smaller than a pattern point 8 of the two-dimensional pattern 3, because the accuracy can be increased further as a result. However, the method also functions if this condition is not met.

Furthermore, different patterns 3 can also be projected in succession.

Preferably more than two, in particular, as shown, four cameras 4.1, 4.2, 4.3, 4.4 from different viewing angles 6.1, 6.2, 6.3, 6.4 are used, which all look into the same measuring volume, i.e. see and capture the same pattern 3 projected by the projector 9.

As a result, the disadvantage of reflections in each camera 4.1, 4.2, 4.3, 4.4 appearing at other locations of the image, becomes an advantage. Since each location has to be viewed using only at least two cameras 4.1, 4.2, 4.3, 4.4, there are far fewer locations that cannot be measured, i.e. in which it is not possible for at least two of the four cameras 4.1, 4.2, 4.3, 4.4 to deliver an evaluable image.

The same also applies for shadows and all other types of interference which occur or can occur, for the different cameras 4.1, 4.2, 4.3, 4.4 (owing to the different viewing angles 6.1, 6.2, 6.3, 6.4), at different locations of the image.

Four cameras 4.1, 4.2, 4.3, 4.4 have been found to be particularly advantageous, because it is then very likely that at least two cameras 4.1, 4.2, 4.3, 4.4 will provide information for each pixel. It is furthermore advantageous to use an algorithm that does not evaluate the cameras in pairs, but rather, for each pixel, all the cameras 4.1, 4.2, 4.3, 4.4, deliver, together, the information relating to all the pixels. As a result, the accuracy is increased and the measurement is more robust.

Since this is a highly redundant system, it is furthermore possible for the calibration to be redetermined again and again, as has already been explained in detail.

Figure 2:
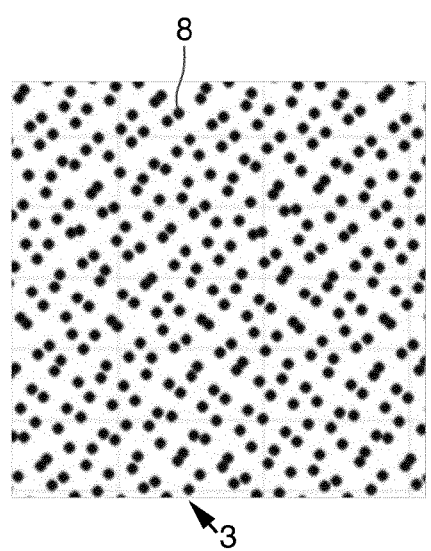
FIG. 2 shows, by way of example, a two-dimensional pattern that can be applied according to the invention and that is projected onto the object surface of the object to be measured, and FIG. 3 schematically shows the method progression of a basic embodiment of the method proposed according to the invention.
Figure 3:
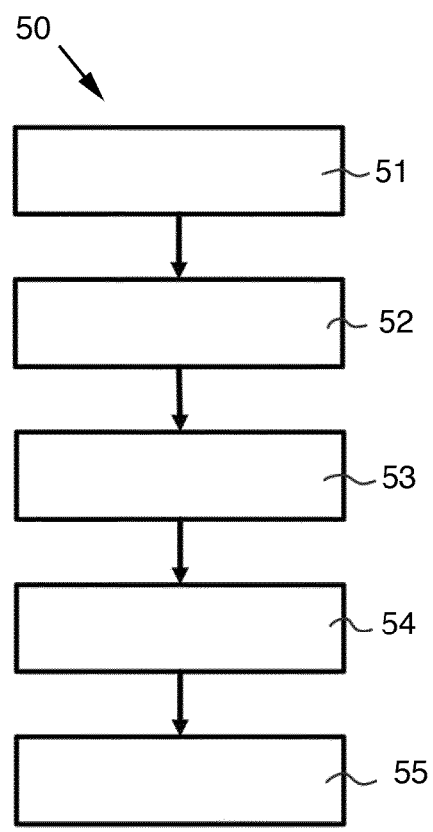

The method progression shown in FIG. 3 describes the execution of a basic variant of the method proposed according to the invention which, if necessary, can be expanded by the variant already described, and can be executed by means of the systems described, by way of example, in FIGS. 1 and 2.

Within the context of the proposed method 50 for measuring objects 2 by means of stereoscopy, in a first method step 51 a two-dimensionally coded pattern 3 is projected onto the object surface by means of the projector 9, and the pattern 3 that is designated a scene and is projected onto the object surface is captured by means of the four cameras 4.1, 4.2, 4.3, 4.4 which are preferably triggered simultaneously. The two-dimensional coding is created as a result.

Subsequently, in a second method step 52, a temporally coded pattern having a two-dimensionally different coding is projected several times in succession, and a plurality of scenes are captured in succession by the cameras 4.1, 4.2, 4.3, 4.4, being triggered simultaneously in each case. As a result, a temporally coded pattern is generated, each scene also representing, in its own right, an independent two-dimensional coding. The temporally coded pattern is generated by a plurality of spatial shifts of the same two-dimensionally coded pattern 3.

In a further method step 53, in the case of the two-dimensional coding, correspondences of adjacent pixels are found, in the scene, in the images captured by the different cameras 4.1, 4.2, 4.3, 4.4, by means of comparison with adjacent pixels. As a result, the same pixels are identified and optionally measured in the individual images.

In a further method step 54, in the case of the temporal coding, for the plurality of scenes correspondences of the same pixels, in each case, are found in the images captured by the different cameras. As a result, the same pixels are identified and optionally measured in individual images.

In a following method step 55, for each pixel, the identified correspondences of the two-dimensional coding and the temporal coding are correlated, and said correlations are used when measuring the object.

FIG. 4 schematically shows the result of the measurement of a three-dimensional object 20 which is superimposed in said figure, schematically, in the contour. The object has an upper surface 21 with respect to the object height (in the sense of a higher surface), and a lower surface 22 (in the sense of a surface that is lower down). The upper surface 21 comprises an edge 23 on the margin thereof, at which edge it transitions into the lower surface 22.

A grid 24 is furthermore shown, by means of which the surface of the object 20 is intended to be scanned, de facto, by the measurement. Ideally, the upper surface 21 is associated with one grid element 24a and the lower surface 22 is associated with one grid element 24b. The grid 24 is generated during measurement in accordance with the method according to the invention, each of the grid elements 24a, 24b being described by a three-dimensional coordinate point 25 which was determined by stereoscopy. The grid element size can, but does not have to, correspond to the pixel of the camera. Typically, a grid element is preferably formed by a plurality of combined camera pixels. The entirety of the coordinate points 25 is also referred to as a point cloud, which describes the measurement of the surface of the object 20 as a result. Accordingly, coordinate points 25a are associated with the upper surface, and coordinate points 8b are associated with the lower surface 25b.

Coordinate points 25c describe grid elements that are located in the region of the edge 23. These are usually associated with an error 26 which is due to the fact that the evaluation of the camera pixels in the region of the edge is difficult, and the coordinates of the grid elements of the grid 24 can be determined by means of stereoscopy often only with significant errors. Furthermore, there are grid elements 24c for which no coordinate point at all was calculated, for example because the stereoscopic evaluation of the camera images was incorrect. Grid elements 24c of this kind, without a coordinate point, are frequently located in the region of the edge 23.

While FIG. 5 illustrates, in a theoretical manner, the systematic procedure when measuring the object 20, FIG. 4 shows the point cloud as the entirety of the coordinate points 25, as are determined by the method proposed according to the invention. In the region of the continuous surfaces 24a, 24b, the surface of the object 20 can be very clearly identified, as a whole, by the coordinate points 25a, 25b.

However, the reconstructed edge 27 which would be extracted from a point cloud 25 of this kind (i.e. the entirety of the coordinate points) is associated with errors, because the coordinate points 25c associated with errors, and the gaps resulting from said grid elements 24c, are incorporated into the reconstructed edge 25, which is therefore blurred and frayed.

For the purpose of correction, the invention proposes, in the region of edges 23 (to be understood in general as a discontinuous surface region of the object 20), also evaluating a camera image 28 of at least one of the cameras 4.1, 4.2, 4.3, 4.4, by means of which the scene is captured, by means of two-dimensional image analysis for edge identification, in addition to the measurement of the object by means of stereoscopy. This is shown schematically in FIG. 6.

FIG. 6 shows the upper part of the point cloud comprising the coordinate points 25a that represent the upper surface 24a of the object 20. Furthermore, the reconstructed edge 27 and the associated coordinate points 25a, 25c of the upper surface 25a and on the edge 23 are shown.

In the camera image 28 of said scene from one of the cameras 4.1, 4.2, 4.3, 4.4, the edge 23 of the object 20 was additionally evaluated by means of two-dimensional image analysis, in which, according to the invention, edge identification was also performed. This can be achieved by conventional methods for two-dimensional image evaluation, for example by means of contour identification. Said methods are known in principle to a person skilled in the art, and do not need to be described in greater detail.

As a result, the edge 23 in the camera image 28 can be extracted to a sub-pixel accuracy, and can be parameterized accordingly in the two-dimensional image coordinates. The parameterized edge 29 can, as shown in FIG. 6, be represented as a line. This overlaps with the course of the edge 23 in the captured image 28.

Said edge 29 which is parameterized in the two-dimensional image is transformed into the real coordinates of the scene by means of the known camera calibration. In other words, the two-dimensionally parameterized edge 29 is transformed into the three-dimensional scene. The parameterized edge 29 can thus be represented as a three-dimensional edge 30 in the coordinates of the scene.

Finally, the three-dimensional edge 30 can be projected into the point cloud of the coordinate points, which point cloud describes the surface of the measured object 20. Said projection can three-dimensional edge 30 in the point cloud of the coordinate points, is shown in FIG. 6 by the dashed lines. Said projection is not a transformation—the three-dimensional coordinates of the three-dimensional edge 30 and the projected edge 31 are the same. The projection is merely a combined representation of the coordinate points 25 and the three-dimensional edge 30. This relates to a graphical projection, as is shown by FIG. 6. However, within the meaning of this text, projection is also intended to be understood as digital projection which is also used, for example, for digital reconstruction of the surface of the object 20, and in which the three-dimensional edge 30 and the coordinate points 25c at the edge can be taken into account, in order to generate, overall, a realistic edge progression in the measurement of the surface, for example by averaging the coordinates described by the edge progression, by suppressing identified incorrect coordinates or the like.

As a result, the edge 23 of the object 20 can be measured (determined) substantially more accurately than merely from the point cloud of the coordinate points 25 reconstructed by stereometrics. In this case, it is particularly advantageous for the reconstruction, to a sub-pixel degree of accuracy, of the edge progression, leads to a substantially more precise and smoother reconstruction than does purely stochiometric measurement.

It should also be noted that, for reasons of clarity, a planar edge was denoted here. However, the method functions with any shape of edge, any singularity or any discontinuous (erratic) transition in the surface of the object 20 being considered an edge within the meaning of this description.

As a result of the combination of two-dimensional and temporal codings, which is particularly preferably proposed according to the invention, and the preferred use of at least three cameras 4.1, 4.2, 4.3, 4.4, the measurement of three-dimensional objects 2 is particularly robust.

LIST OF REFERENCE SIGNS 1 system for measuring a three-dimensional object
2 three-dimensional object
3 pattern projected/to be projected
4.1 camera
4.2 camera
4.3 camera
4.4 camera
5 arithmetic unit
6.1 viewing angle of the camera
6.2 viewing angle of the camera
6.3 viewing angle of the camera
6.4 viewing angle of the camera
7 projection
8 pattern points of the pattern projected/to be projected
9 projector
20 object
21 upper surface of the object
22 lower surface of the object
23 edge
24 grid
24a grid element of the upper surface
24b grid element of the lower surface
24c grid element without coordinate point
25 coordinate point of a grid element
25a coordinate point of the upper surface
25b coordinate point of the lower surface
25c coordinate point at the edge
26 error of the coordinate point
27 reconstructed edge
28 camera image
29 parameterized edge
30 three-dimensional edge
31 projected edge
50 method for measuring objects by means of stereoscopy
51 method step
52 method step
53 method step
54 method step
55 method step

The invention claimed is:

1. A method for measuring an object by means of stereoscopy using a projector to project a pattern onto a surface of the object and using intrinsically and extrinsically calibrated cameras to capture the pattern, which is designated as a scene, on the object surface, said method comprising:
projecting a completely two-dimensionally coded pattern via the projector and capturing the scene from different viewing angles using three cameras, and
projecting a temporally coded pattern having a two-dimensionally different coding via the projector several times in succession, and capturing a plurality of scenes in succession by the three cameras, being triggered simultaneously in each case,
finding correspondences of the scene in the images captured by the cameras by means of an arithmetic unit using image processing,
wherein, in the case of the two-dimensional coding, correspondences of adjacent pixels are found for the scene in the images captured by the different cameras and wherein, in the case of the temporal coding for the plurality of scenes, correspondences of the same pixels, in each case, are found for the scene in the images captured by the different cameras, and measuring the object by means of the correspondences found in the two-dimensional and temporal coding generated during the pattern projections, wherein for each pixel, identified correspondences of the two-dimensional coding and the temporal coding are correlated, said correlations being used when measuring the object, forming sub-systems of two cameras from the three cameras, wherein three sub-systems are formed each having two cameras, each two of said three sub-systems comprising exactly one identical camera, and wherein a recalibration of cameras is performed such that, for calibrating one sub-system, the measured values of the other sub-systems are used.

2. The method of claim 1, wherein the temporally coded pattern is generated by spatial shifting of the same two-dimensionally coded pattern.

3. The method of claim 2, wherein the spatial shift of the pattern and the capturing of the scene by the cameras triggered simultaneously are not matched to one another.

4. The method of claim 2, wherein the size of the spatial shift of the pattern between the scenes captured in succession differs.

5. The method of claim 2, wherein the size of at least one of the spatial shifts is smaller than a pattern point of the two-dimensional pattern.

6. The method of claim 1, wherein the temporally coded pattern is generated by phase-shifted projection of a brightness distribution.

7. The method of claim 1, wherein the temporally coded pattern is generated by temporally offset projection of different patterns.

8. The method of claim 1, wherein, for one pixel, a correlation of information of all cameras is performed.

9. The method of claim 1, wherein the images of individual cameras are evaluated by means of two-dimensional image analysis for edge detection, and in that an edge identified in an image is projected into a three-dimensional point cloud which represents a result of the three-dimensional measurement of the object.

10. The method of claim 9, characterized in that, for the two-dimensional image analysis, the scene is additionally captured by the cameras without projection of a pattern.

11. A system for measuring objects by means of stereoscopy, comprising a projector for projection of a coded pattern onto the object surface, comprising cameras for capturing the pattern that is designated a scene and is projected onto the object surface, and comprising an arithmetic unit which is designed, by means of a program for image processing, to find correspondences of the scene in the images captured by the cameras, and to perform a measurement of the object by means of the correspondences found, the cameras being intrinsically and extrinsically calibrated, characterized in that at least three cameras are provided and are arranged such that the scene is captured from at least three different viewing angles, and in that the arithmetic unit is designed to perform a method according to claim 1.

12. The system of claim 11, wherein the arithmetic unit and/or the projector are designed to generate a pattern projection having a two-dimensional and a temporal coding.

13. A method for measuring an object by means of stereoscopy using a projector to project a pattern onto a surface of the object and using intrinsically and extrinsically calibrated cameras to capture the pattern, which is designated as a scene, on the object surface, said method comprising:

projecting a completely two-dimensionally coded pattern via the projector and capturing the scene from different viewing angles using at least four cameras, and projecting a temporally coded pattern having a two-dimensionally different coding via the projector several times in succession, and capturing a plurality of scenes in succession by the at least four cameras, being triggered simultaneously in each case, finding correspondences of the scene in the images captured by the cameras by means of an arithmetic unit using image processing, wherein, in the case of the two-dimensional coding, correspondences of adjacent pixels are found for the scene in the images captured by the different cameras and wherein, in the case of the temporal coding for the plurality of scenes, correspondences of the same pixels, in each case, are found for the scene in the images captured by the different cameras, and measuring the object by means of the correspondences found in the two-dimensional and temporal coding generated during the pattern projections, wherein for each pixel, identified correspondences of the two-dimensional coding and the temporal coding are correlated, said correlations being used when measuring the object, forming sub-systems of two cameras from the four or more cameras, wherein two sub-systems are formed each having two cameras, each of said two sub-systems having two different cameras, and wherein a recalibration of cameras is performed such that, for calibrating one sub-system, the measured values of the other sub-system are used.

* * * * *